United States Patent [19]

Herchenroeder

[11] 3,914,759

[45] Oct. 21, 1975

[54] SELSYN DIGITAL TRANSDUCER

[75] Inventor: Louis W. Herchenroeder, Williamsville, N.Y.

[73] Assignee: Westinghouse Electric Corporation, Pittsburgh, Pa.

[22] Filed: Jan. 28, 1974

[21] Appl. No.: 437,401

[52] U.S. Cl............ 340/347 SY; 318/603; 318/654; 340/347 AD

[51] Int. Cl.$^2$ G05B 1/06; G05B 19/28; H03K 13/02

[58] Field of Search ... 340/347 SY, 347 AD, 347 P; 318/563, 603, 654

[56] References Cited

UNITED STATES PATENTS

| | | | |
|---|---|---|---|
| 2,850,240 | 9/1958 | Dickinson | 340/347 SY |
| 3,066,286 | 11/1962 | Wright | 340/347 P |
| 3,099,830 | 7/1963 | Wayman | 340/347 P |
| 3,478,346 | 11/1969 | Narukiyo | 340/347 P |
| 3,688,306 | 8/1972 | Oishi et al. | 340/347 P |

*Primary Examiner*—Thomas J. Sloyan
*Attorney, Agent, or Firm*—James J. Wood

[57] ABSTRACT

A selsyn adapted for operation as a digital transducer. The three phase winding of the stator is connected as a primary. The rotor, having a single phase winding, is connected as a secondary. A three phase bridge circuit is electrically coupled to the three phase winding. Optical couplers are coupled to the three phase bridge circuit to deliver six conduction pulses per cycle. A detector of the rotational displacement intelligence of the rotor is coupled to the single phase winding to deliver an output pulse as a function of the alignment of the single phase winding with one of the three phase windings, the alignment occurring every 60° of rotor revolution. A logic circuit is coupled to the optical couplers and to the rotational displacement detector for identifying the coincidence of the six conduction pulses with one of the output pulses respectively, each coincidence delivering a digital bit which is a function of the rotor displacement.

4 Claims, 4 Drawing Figures

SELSYN DIGITAL TRANSDUCER

CROSS REFERENCE TO RELATED APPLICATION

None.

BACKGROUND OF THE INVENTION

1. Field of the Invention:

This invention relates to digital transducers.

2. Description of the Prior Art:

In rolling mill applications selsyns are employed to couple the position feedback system to the element being controlled such as a screwdown motor or a side guard mechanism. In a typical situation, the selsyn transmitter is mounted near the mill, and the selsyn receiver is located in cabinets at the control station. The receiver is coupled to a gear reducer which drives a digital transducer, which may be either of the incremental type or the absolute commutator type. The coded output of the transducer is compared with a reference signal, to derive an error signal which is fed to the adjustable feed drive system for the screwdown motor or the sideguard mechanism. The process continues until the error signal is reduced to zero, at which time the controlled element i.e. screwdown motor, will then be in the position commanded by the reference signal.

The present invention proposed to utilize the selsyn transmitter directly as a digital transducer thereby eliminating the selsyn receiver, the gear reducer mechanism and the digital transducer assembly located in the cabinets at the sites of the control station. the concomitant advantages reside in improved reliability, reduced cost and an overall improvement in the dynamic performance of the digital transducer system.

SUMMARY OF THE INVENTION

The invention describes the adaptation of a selsyn as a digital transducer. The stator of the selsyn has its three phase winding connected as a primary. The rotor, having a single phase winding is connected as a seondary. A three phase bridge circuit is coupled to the three phase winding. Optical means are coupled to the three phase bridge circuit to deliver six conduction pulses per cycle. Means for detecting the rotational displacement intelligence of the rotor, are coupled to the single phase winding to deliver an output pulse as a function of the alignment of the single phase winding with one of the three phase windings, every 60° of rotor revolution. Finally, detecting and identifying means are coupled to the optical coupling means and to the rotational displacement intelligence means, for detecting and identifying coincidence of the six conduction pulses with one of said output pulses respectively, each coincidence delivering a digital bit which is a function of rotor displacement.

GENERAL DISCUSSION

The selsyn transmitter is used as a digital transducer with simple and inexpensive circuitry to provide a small number of bits per revolution. The limited intelligence received is entirely adequate for most mill applications.

The usually commercially available selsyns of a type suitable for application in mill environments, are two pole machines with a single phase primary winding, and a three phase secondary winding. If the single phase winding is rotated, it will align itself with one of the three phase windings every 60° of revolution. If these points of coincidence can be detected, six bits of positional information are available per revolution of the selsyn. Rotating the selsyn at 1200 rpm will then provide 120 bits per second. In most commercial applications of position regulators less than 50 bits per second are required, in fact, all but a very few require less than 100 bits per second. Selsyns are normally excited with a single phase sinusoidal voltage on the primary. The secondary voltage then has two components, one of which is the sum of the supply and rotational frequencies, and the other of which is the difference between the supply and rotational frequencies. At low rotational speeds, the secondary voltage is a well behaved alternating voltage modulated by the angular position of the rotor. At higher speeds the secondary voltage becomes irregular, making it somewhat awkward to extract the intelligence identified with the position of the rotor.

DESCRIPTION OF AN EXEMPLARY EMBODIMENT

Figure 1:
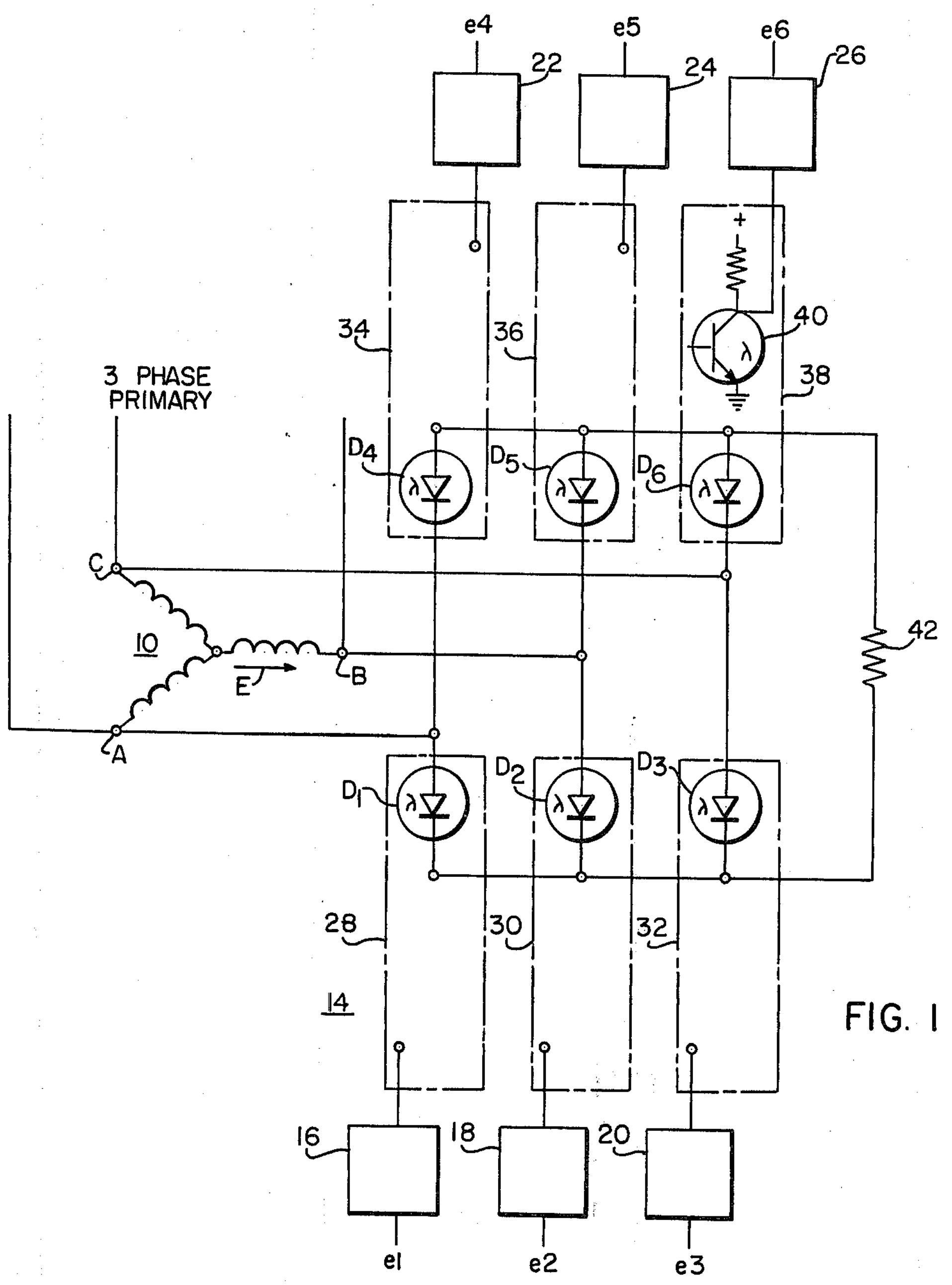
FIG. 1 is a circuit diagram of the selsyn stator connected as a three phase primary in accordance with the invention.

In FIG. 1, the three phase winding indicated generally at 10 of the selsyn digital transducer is arranged as the primary by connecting it to a three phase system of sinusoidal voltages. The single phase winding (FIG. 2:12) becomes the secondary, and in an ideal machine has a sinusoidal voltage with frequency and magnitude proportional to slip.

Referring back to FIG. 1, the three phase winding 10 is connected to a three phase bridge circuit indicated generally at 14. The bridge circuit is coupled to NAND logic elements 16, 18, 20, 22, 24, 26 by means of optical couplers indicated generally at 28, 30, 32, 34, 36, 38 respectively. Each of the optical couplers comprises a phototransistor positioned in operative proximity to a light emitting diode.

In the interest of clarity only optical coupler 38 is shown in detail. The light emitting diodes are identified as $D_1$, $D_2$, $D_3$, $D_4$, $D_5$ and $D_6$. In optical coupler 38 diode $D_6$ is shown in proximity to phototransistor 40. The output of the phototransistor 40 is taken between its collector and ground and applied to NAND circuit 26. In the remaining optical couplers 28, 30, 32, 34 and 36, the collector of the proximate phototransistor is symbolized by dots which are connected to the NAND logic elements 16, 18, 20, 22 and 24. Completing the description of the bridge circuit, a load resistor is identified at 42.

Figure 2:
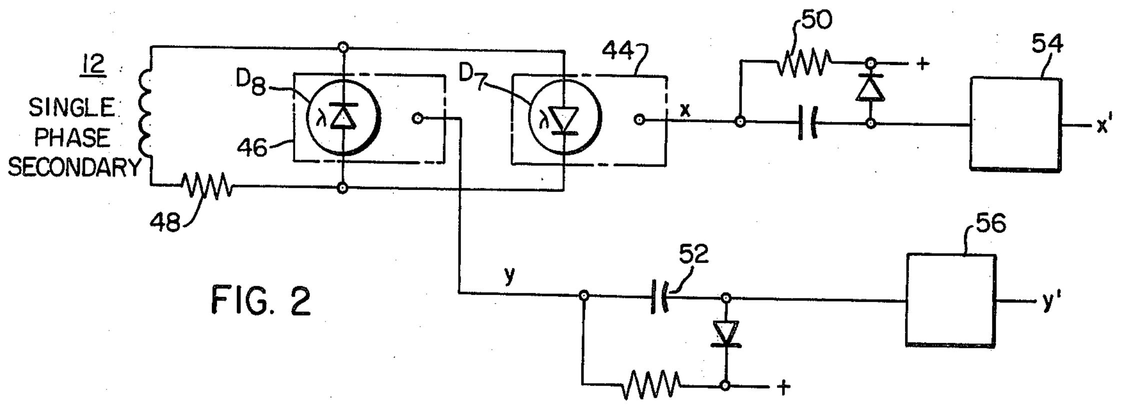
FIG. 2 is a circuit diagram of the selsyn rotor connected as a single phase secondary in accordance with the invention.

Referring now to FIG. 2, the single phase secondary 12 is connected in parallel with optical couplers indicated generally at 44 and 46. A resistor 48 is in series with the secondary 12. The light emitting diodes are identified at $D_7$ and $D_8$. The output of optical coupler 44 is applied to a differentiating circuit indicated generally at 50; the output $y$ of optical coupler 46 is applied to a differentiating circuit indicated generally at 52. The differentiating circuit 50 is connected to NAND logic element 54, while differentiating circuit 52 is connected to NAND logic element 56. The outputs of the NAND elements 54, 56 are identified as $x'$ and $y'$ respectively.

Figure 3:
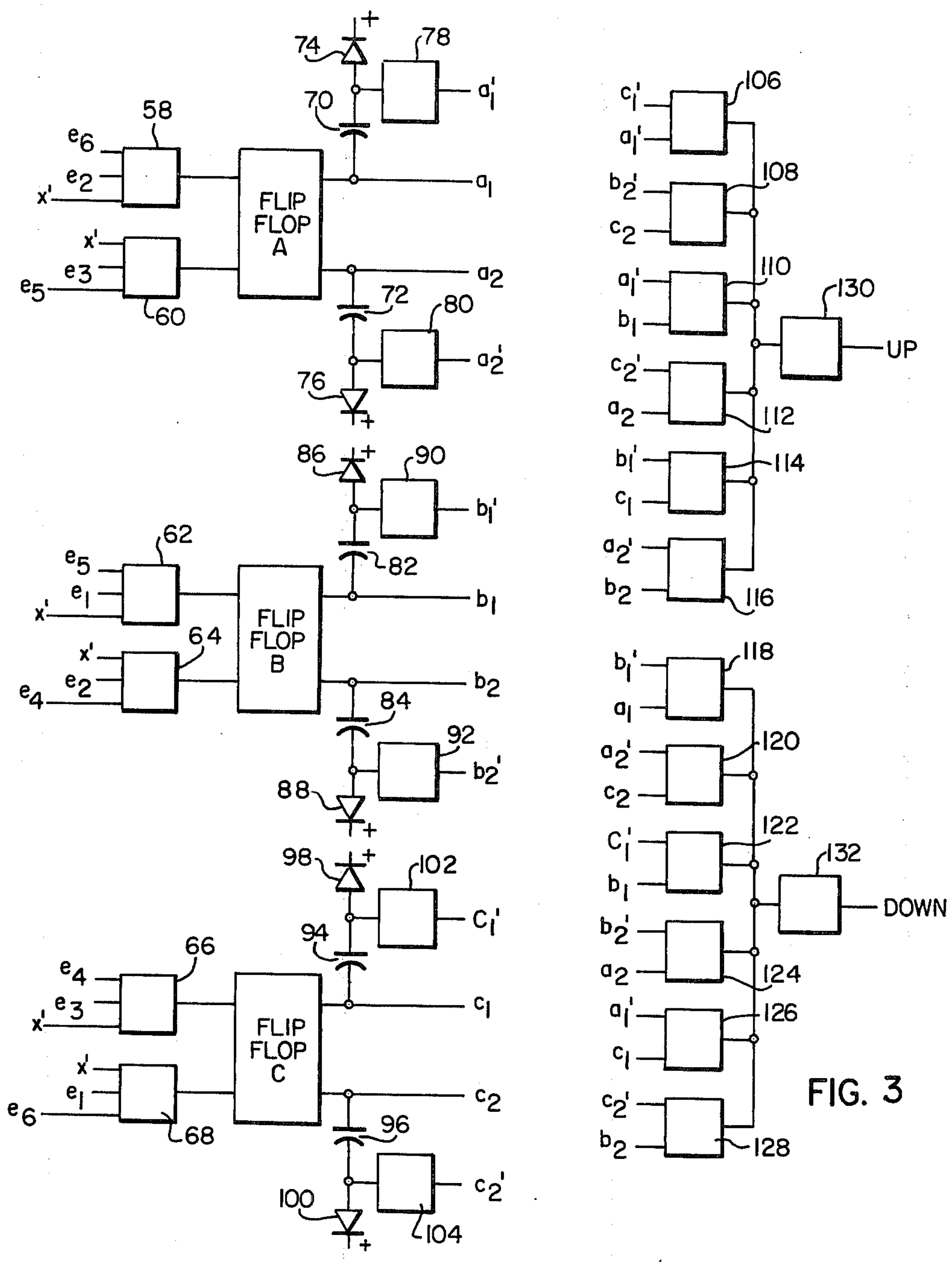
FIG. 3 is a logic schematic for digitally detecting the rotational displacement of the rotor.

The positional intelligence depicted by the rotational displacement of the rotor is detected and decoded by the circuitry of FIG. 3, Three flip flops are identified at A, B, and C. The $x'$ signal and the signals from the three phase bridge $e_1$, $e_2$, $e_3$, $e_4$, $e_5$ and $e_6$ control the high (one) and low (zero) states of the respective flip flops. It should be noted at this point that connections for the $y'$ signal have been omitted in the interests of clarity. The $y'$ set of signals need not be used unless the higher sampling rate is desired.

The signals $e_6$, $e_2$, $e_3$, $e_5$ and $x'$ are connected to NAND logic elements 58 and 60 as indicated, for control of flip flop A. The signals $e_5$, $e_1$, $e_2$, $e_4$ and $x'$ are connected to NAND logic elements 62 and 64 as indicated for the control of flip flop B. The signals $e_4$, $e_3$, $e_1$, $e_6$ and $x'$ are connected to NAND logic elements 66 and 68 as indicated for the control of flip flop C.

Capacitors 70, 72 are connected respectively to the outputs $a_1$ and $a_2$ of flip flop A. Diodes 74, 76 have their cathodes returned to + supply and function to protect the input to the circuit. The capacitors 70, 72 are connected to NAND logic elements 78, 80 respectively.

Similarly, associated with flip flop B, are capacitors 82, 84, protective diodes 86, 88 and NAND logic elements 90, 92.

Finally, associated with flip flop C, are capacitors 94, 96, protective diodes 98, 100 and NAND logic elements 102, 104. Up NAND logic elements are identified at 106, 108, 110, 112, 114 and 116. Down NAND logic elements are identified at 118, 120, 122, 124, 126 and 128. The outputs of flip flops A viz $a_1$, $a_1'$, $a_2$, $a_2'$ are connected to NAND logic elements 110, 126, 106, 118, 116, 120 and 112, 124, respectively. Similarly, flip flop B and flip flop C are connected to the up and down NAND logic elements as indicated.

The outputs of the up NAND logic elements are applied as inputs to NAND logic element 130 and the outputs of the down NAND logic elements are applied as inputs to NAND logic element 132.

OPERATION

Figure 4:
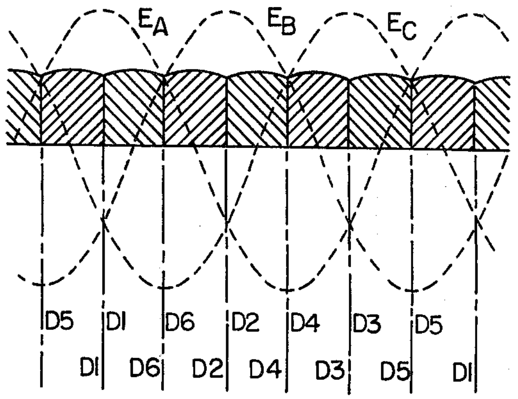
FIG. 4 is a diagram showing the voltage to neutral and the load current for the three phase bridge circuit utilized in the FIG. 1 circuitry.

Referring to FIG. 1 and FIG. 4, each secondary carries current on both half cycles. As shown in FIG. 4 it can be seen that when $E_a$ is positive, D1 conducts for 120°; during the first 60° it is in series with D5 whose cathode is most negative on phase $E_b$, and during the second 60° it is in series with D6 whose cathode is then most negative on phase $E_c$. The shape of the current pulses in the load is that of a six-phase rectifier.

As depicted in FIG. 4, the diodes then conduct in the ordered sequence: D5, D1; D1, D6; D6, D2; D2, D4; D4, D3; D3, D5; D5, D1, etc. The conduction of a photodiode, for example D6 causes light to be emitted which falls on the base-emitter junction of the associated photo-transistor, for example 40 causing it to conduct heavily so that its collector is very nearly at ground.

Referring now to FIG. 3 initially the flip flops are in the following states:

Flip Flop A $a_1 = 0$ $a_2 = 1$
Flip Flop B $b_1 = 0$ $b_2 = 1$
Flip Flop C $c_1 = 1$ $c_2 = 0$ The NAND logic elements are respectively in the following states:

| Input | NAND | Output | Input | NAND | Output |
|---|---|---|---|---|---|
| 00 | 106 | 1 | 1 | | |
| 00 | 108 | 1 | 1 | | |
| 00 | 110 | 1 | 1 | 130 | 0 |
| 01 | 112 | 1 | 1 | | |
| 01 | 114 | 1 | 1 | | |
| 01 | 116 | 1 | 1 | | |
| 00 | 118 | 1 | 1 | | |
| 00 | 120 | 1 | 1 | | |
| 00 | 122 | 1 | 1 | 132 | 0 |
| 01 | 124 | 1 | 1 | | |
| 01 | 126 | 1 | 1 | | |
| 01 | 128 | 1 | 1 | | |

The primed outputs only develop a signal when the unprimed output changes from 0 to 1. For example $a_1'$ is a 1 when $a_1$ changes from 0 to 1.

The NAND logic elements 16, 18, 20, 22, 24, and 26 function so that when there is no input signal they develop an output.

Considering now the ordered sequence of FIG. 4 D5 and D1 conduct and signals appearing at $e_5$ and $e_1$ the signals $e_5$ and $e_1$ appear at NAND element 62.

The outputs of the optical couplers 44, 46 in the single phase secondary are connected to NANDS 54, 56 through capacitors (unnumbered) so that their outputs are pulses near the zero crossing of the secondary voltage. The coincidence of the $x'$ pulse with the six different combinations of diode conduction of the three phase bridge identifies six different positions of the selsyn rotor. (As previously indicated the use of the $y'$ pulse will not be described in the interest of simplicity. Further, the utilization of the $y'$ signal does not add any new positions but does double the sampling rate.)

Considering again the sequential firing of the diodes when D5 and D1 conduct producing $e_5$ and $e_1$, the coincidence of these two signals with $x'$ causes a 0 at the output of the three input NAND 62, $b_1$ goes from 0 to 1, and $b_1'$ develops a 1 pulse momentarily. As a result of this change six NAND elements have one of their inputs changed: 110, 114, 116; 118, 122, 128. Of these NAND elements, only NAND 114 has a ONE-ONE input and it therefore develops a zero output. As a consequence, NAND element 130 develops a ONE which is sent to an UP COUNTER (not shown).

The flip flops are now in the following position

Flip Flop A $a_1 = 0$ $a_2 = 1$
Flip Flop B $b_1 = 1$ $B_2 = 0$
Flip Flop C $c_1 = 1$ $c_2 = 0$ The NAND logic elements are in the following states respectively:

| Input | NAND | Output | Input | NAND | Input |
|---|---|---|---|---|---|
| 00 | 106 | 1 | 1 | | |
| 00 | 108 | 1 | 1 | | |
| 01 | 110 | 1 | 1 | 130 | 0 |
| 01 | 112 | 1 | 1 | | |
| 01 | 114 | 1 | 1 | | |
| 00 | 116 | 1 | 1 | | |
| 00 | 118 | 1 | 1 | | |
| 00 | 120 | 1 | 1 | | |
| 01 | 122 | 1 | 1 | 132 | 0 |
| 01 | 124 | 1 | 1 | | |
| 01 | 126 | 1 | 1 | | |
| 00 | 128 | 1 | 1 | | |

When diodes D1 and D6 conduct developing signals $e_1$ and $e_6$ which are applied to NAND 68, flip flop C changes: C1 goes to a zero and C2 goes to a ONE. The presence of $C2 = 1$ and $a_2 = 1$ causes NAND 112 to develop a ZERO, whereby NAND 130 develops a ONE which is sent to the up counter.

As the diode conduction sequence continues D6, D2; D2, D4; D4, D3; D3, D5; the NAND elements 110, 108, 106 and 116 respectively develop a ZERO output causing NAND 130 to send a ONE to the up counter.

Assume that the diodes D5, D1 have just conducted and now the rotor begins to turn in the opposite direction; the signals $e_5$ and $e_1$ are removed. The flip flop B then flips $b_1 \rightarrow 0$, $b_2 \rightarrow 1$ and $b_2'$ develops a momentary ONE. NAND element 124 develops a ZERO and NAND 132 sends a ONE to the down counter (obviously the choice of UP and DOWN is arbitrary so that their roles can be exchanged).

The highest speed at which the selsyn can be driven depends on the sampling rate and the number of pulses per revolution. The limiting speed is lowest when rotating with the field. The maximum bit rate with the field can be shown to be:

$$\frac{PS}{P+S} fo$$

where $p$ = pulses per revolution $S$ = samples per secondary cycle $fo$ = supply frequency For a 60 Hz supply, 6 pulses per revolution and 2 samples per secondary cycle, the maximum bit rate is 90 bits per second which occurs at 900 RPM. It is possible to double this fairly simply by using a phase shifting network to obtain a quadrature secondary voltage which would produce 12 pulses per revolution and 4 samples per cycle. This would result in 180 bits per second at 900 RPM. The bit rates and rpm for a 50 Hz supply would be five-sixths of the figures guoted above.

The proposed system would be suitable for the majority of mill type position regulators and would provide the welcomed combination of greater reliability and lower costs.

The well known stability problems of selsyn drives are avoided along with the concomitant limitations on speed and acceleration. The mechanical assembly of the selsyn receiver, gear reducing unit and incremental encoder are all eliminated. In place of these eliminated components, some filtering is required as well as three phase transformer to provide the low voltage required by the standard selsyn together with eight optical couplers, and one printed circuit board for the logic. For mill cabinets, having more than one position regulator it will not be necessary to duplicate the three phase circuitry.

I claim:

1. A selsyn operated as a digital transducer comprising:

a. a stator having a three phase winding connected as a primary;

b. a rotor having a single phase winding connected as a secondary;

c. a three phase bridge circuit coupled to said three phase winding;

d. optical means coupled to said three phase bridge circuit to deliver six conduction pulses per cycle;

e. means for detecting the rotational displacement intelligence of said rotor, coupled to said single phase winding, to deliver an output pulse as a function of the alignment of said single phase winding with one of said three phase windings, every 60° of rotor revolution; and f. detecting and identifying means coupled to said optical coupling means and to said rotational displacement intelligence means comprising logic means and three flip flops, said flip flops being set and reset in ordered sequence upon the coincidence of said six conduction pulses with one of said output pulses, as a function of the instaneous rotational direction of said rotor, said logic means being coupled to said flip flops to identify as digital bits, six displacements in one direction, and six displacements in the other whereby the displacement of the rotor relative to a datum position may be indication by means of a reversible digital counter responsible to said digital bits.

2. A selsyn according to claim 1 wherein said optical coupling means comprises cooperating photodiodes and phototransistors, arranged in proximity, so that conduction through a photodiode causes the phototransistor to conduct, there being three pairs of cooperating diodes and transistors, one pair for each of said three phase windings.

3. A selsyn according to claim 1 wherein said rotational displacement detecting means comprises optical coupling means, NAND logic means, and capacitance means, the optical means comprising a photodiode and a phototransistor in proximity thereto, the photodiode being connected across said secondary, the phototransistor being connected as an input to said capacitance means, the capacitance means being connected to said NAND logic means which develops a pulse output (logic ONE) near the zero crossings of the voltage on said secondary.

4. A selsyn according to claim 1 wherein said logic means comprises pulse forming means and NAND logic elements, said pulse forming means being connected to each output of said flip flop for developing a momentary pulse (logic ONE) when an output of a flip flop changes from a logic ZERO to a logic ONE, said momentary pulse being coupled to said NAND logic elements for identifying both the direction of the rotor and the angular displacement thereof.

* * * * *